United States Patent
Stout et al.

[11] Patent Number: 5,118,907
[45] Date of Patent: Jun. 2, 1992

[54] SYSTEM AND METHOD FOR MEDICAL DEVICE INTERCONNECTION UTILIZING CONTROLLED DISPENSING OF ELONGATED INTERCONNECTING MEMBER

[76] Inventors: Thomas D. Stout, 9984 Falcon View Dr., Sandy, Utah 84092; Ralph C. McElvain, 4030 Powers Cir., Salt Lake City, Utah 84124

[21] Appl. No.: 436,495

[22] Filed: Nov. 13, 1989

[51] Int. Cl.⁵ .............................................. H01B 7/00
[52] U.S. Cl. .................................... 174/135; 206/328; 206/388; 174/69
[58] Field of Search ................. 604/80; 242/55.18, 86, 242/107, 129, 159; 206/328, 330, 388; 439/502–503, 505, 909, 932; 174/69, 135

[56] References Cited
U.S. PATENT DOCUMENTS

| | | | |
|---|---|---|---|
| 1,592,432 | 7/1926 | Barry | 242/159 |
| 2,253,974 | 8/1941 | Guild | 206/328 X |
| 3,068,316 | 12/1962 | Witt | |
| 3,287,642 | 11/1966 | Simkins | 174/69 |
| 3,310,623 | 3/1967 | Vaughan | |
| 3,515,798 | 6/1970 | Sievert | 174/135 |
| 3,913,587 | 10/1975 | Newash | 128/348 |
| 3,980,176 | 9/1976 | Boggs | 206/392 |
| 3,983,997 | 10/1976 | Warshaw | 206/389 |
| 4,220,295 | 9/1980 | Green et al. | 242/170 |
| 4,348,439 | 9/1982 | Jones | 428/36 |
| 4,389,440 | 6/1983 | Keith | 428/36 |
| 4,475,649 | 9/1984 | Haarbosch | 206/328 |
| 4,637,516 | 2/1987 | de Roure | 206/471 |
| 4,643,305 | 2/1987 | De Roure Olivier | 206/388 |
| 4,654,026 | 3/1987 | Underwood | 604/80 |
| 4,750,643 | 6/1988 | Wortrich | 222/81 |
| 4,979,614 | 12/1990 | Rahaut | 206/328 |

Primary Examiner—C. Fred Rosenbaum
Assistant Examiner—C. Maglione
Attorney, Agent, or Firm—Workman, Nydegger & Jensen

[57] ABSTRACT

A system for interconnecting two medical devices with a flexible elongated interconnection member, such as a cord, a wire, or a tube, includes two separates lengths of the elongated member and a selectively releasable electric coupling therebetween. One or both lengths of the elongated member contain a cord dispenser which comprises a portion of that length of the cord wound into a tubular coil and a tubular casing coaxially encircling the coil and having openings at opposite ends thereof. Preferably, the inner surface of the casing is in gripping engagement with the outer surface of the coil. Depending on the manner in which the coil is wound, the cord and the coil can be controllably unwound from the coil in the casing by withdrawing an end of the cord from one or both exit openings in the casing. Preferably, however, one end of the cord passes longitudinally through the center of the coil from a winding at one end to an exit opening in the casing at the other end. Optionally the other end of the cord is disposed between the coil and casing. In one embodiment both ends of the cord pass through a single exit opening. The ends of each length of cord not coupled to each other may be provided with a cord stiffening interconnection handle to facilitate the coupling of that end to non-sterile medical equipment without compromising the sterile field in which the individual doing so is to operate.

54 Claims, 5 Drawing Sheets

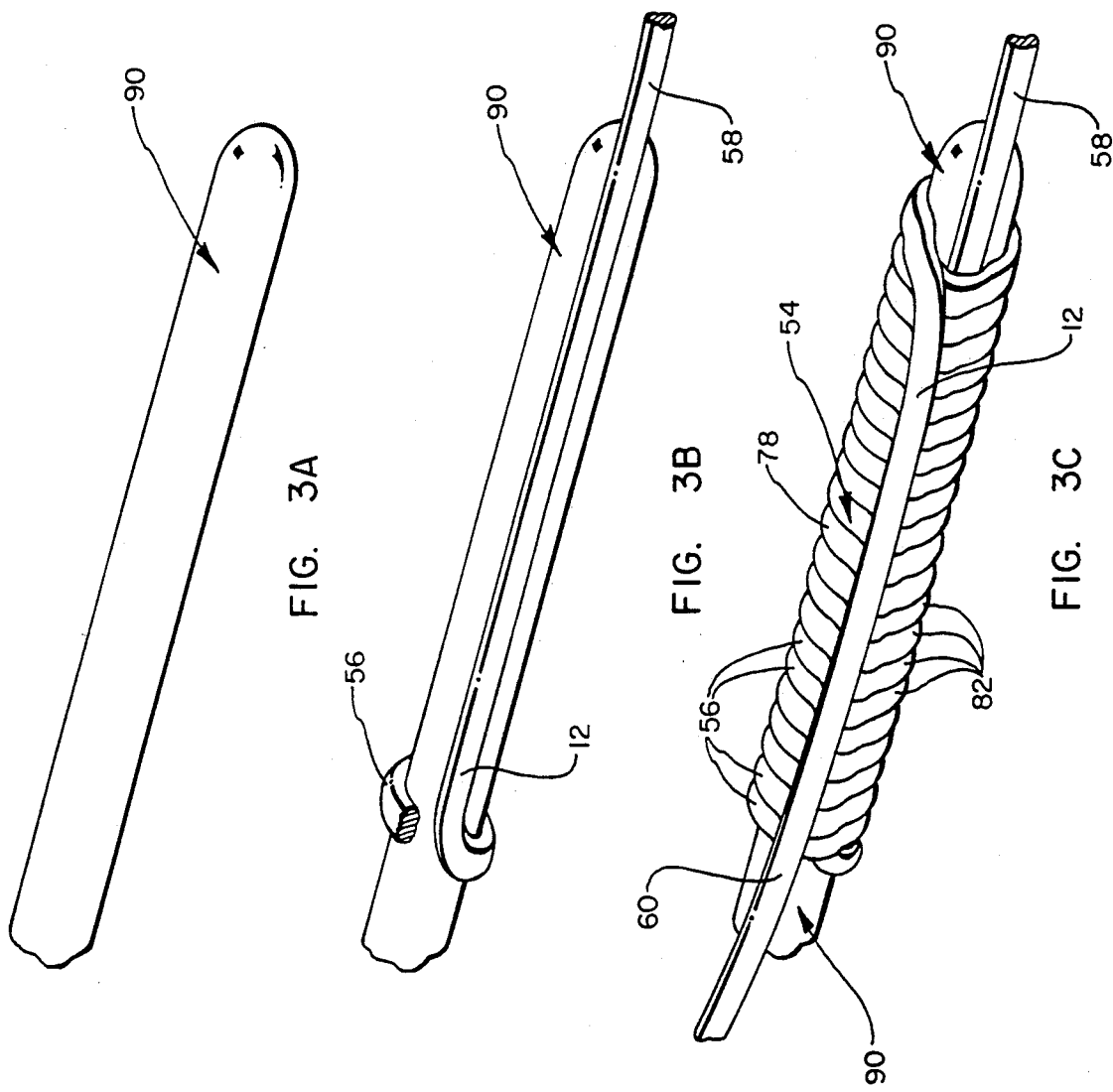

SYSTEM AND METHOD FOR MEDICAL DEVICE INTERCONNECTION UTILIZING CONTROLLED DISPENSING OF ELONGATED INTERCONNECTING MEMBER

BACKGROUND

1. The Field of the Invention

Broadly conceived, the present invention relates to the storage and controlled dispensing of a predetermined portion of the length of a flexible, elongated member, such as a wire, a tube, a cord, or the like. More particularly, the invention pertains to the controlled dispensing of sterile cord or tubing used to interconnect devices employed in medical procedures. In one medical application, the present invention has specific utility in a system for electrically interconnecting to a monitor the output signal of a pressure sensing transducer used in connection with an angioplasty syringe.

2. The Background of the Invention

Flexible elongated members, such as wires, tubes, cords, or the like, are frequently utilized to interconnect locations or equipment that are separated by a distance shorter than the length of the elongated member itself. Thus, a lengthy extension cord may be used between a wall socket and a string of Christmas tree lights, where only a short length of cord needs to be added to the wiring of the lights. Alternatively, an intravenous feed tube of substantial length that is provided with fluid-sealing couplings at each end may still be used to interconnect a fluid source to a patient or to medical equipment which is very close to the source of fluid. While the interconnection function may be adequately performed by the overly long elongated member under some circumstances, the unused length of the elongated member can prove to be a problem.

First, lengthy, unused sections of such an elongated interconnection member clutter the environment and frequently become entangled with each other, or trip passersby. Such accidents may in turn result in the detachment of the interconnection member from the equipment to which it has been coupled, or the overturning and damaging of that equipment. Where a tube is involved as the elongated interconnection member, unused sections thereof have a tendency to become coiled upon themselves and then kinked, restricting or completely blocking fluid flow therethrough.

Unnecessary lengths of wires, tubes, or cords have been known to migrate out of the immediate vicinity of their utility to become trampled, pinched in doors, or otherwise abused. In some electrical applications it may be essential to keep an interconnecting wire from inadvertently moving into proximity with other electrical equipment or with ferror magnetic objects which may distort signals on the wire or be affected by signals passing therethrough.

Loose lengths of unused wires, tubes, or cords can stray out of properly designated areas and become contaminated by paint, chemicals, greases, or merely germs. In surgery an unnecessarily long interconnecting wire tube or cord can, by merely touching the floor or a non-sterilized piece of furniture, subsequently become the source of dangerous infection when medical personnel fail to recognize that it is no longer a sterile object. Handling such a contaminated length of wire, cord, or cord will then contaminate medical workers or even the patient, reducing the chances of preventing infection.

Thus a general need exists to contain and controllably dispense the portion of the length of an elongated member actually required for interconnection purposes, while at the same time retaining the unused length of the elongated member in a compact form which avoids tangling, snagging, damage, uncoupling, and contamination.

For example, one area in which the control of the unused lengths of an elongated interconnecting member has proved critical is in the environment of the modern surgical operating room. There, pieces of equipment, such as pumps, monitors, catheters, and sampling devices need to be interconnected variously with each other, with a patient, or with sources of electric power, positive or negative pressure, medication, or fluids in the form of liquids or gasses. These interconnections are accomplished using flexible elongated members, such as wires, cords and tubes, which convey fluids, communicate pressures or signals, and supply power. Unused lengths of these elongated interconnecting members can turn an operating room into a confusing jumble, capturing the attention of medical personnel in a web of distracting equipment, while presenting needlessly dangerous opportunities for tripping and/or equipment damage.

In many cases it is also essential to maintain the sterility of such elongated interconnecting members so that subsequently both intentional and inadvertent contact therewith by medical personnel or by other sterile equipment will not transfer contaminants thereto. Thus, particularly in the hopefully controlled environment of an operating room, the controlled dispensing of useful lengths of a portion of an elongated interconnecting member, and the retention of the balance thereof in a compact and sanitary form is desirable.

In the previous paragraph, one aspect of the present invention addresses this need.

Many interconnection systems for use in medical procedures can benefit from the incorporation of this aspect of the present invention thereinto. To give a concrete example, consider the field of angioplasty. Over time, blood vessels may become partially or totally blocked due to a buildup of cholesterol plaque along the walls of the vessel. One location where plaque buildup is particularly dangerous is within the coronary arteries which supply oxygen-rich blood to the heart. When plaque builds up within these arteries, a condition commonly referred to as coronary heart disease can cause serious chest pain, or angina, and may eventually cause heart failure. Angioplasty is a procedure for reducing the blockage which may occur in these and other blood vessels.

This is accomplished by inserting a balloon-tipped catheter into the blocked artery and inflating the balloon with a controlled syringe to compress the plaque at the blockage, thereby expanding the narrowed artery. Typically, an introducer sheath is inserted through an incision made in the groin or in an artery in the arm. An x-ray sensitive dye is injected into the coronary artery through a catheter that is introduced through the sheath. The dye enables the doctor through the use of real time x-ray techniques to clearly view the arteries on a television monitor and thereby to locate the artery blockage. A balloon-tipped catheter with a guidewire at the end thereof is advanced through the artery to the point of blockage with the help of the x-ray monitor. The catheter is placed in the middle of the blockage and inflated for approximately 10 to approximately 60 seconds. Thereafter, the balloon is deflated and the procedure repeated several times at different places to compress the plaque on the arterial walls. After the results are checked, the balloon catheter and guidewire are removed.

This procedure is much less expensive and less dramatic to the patient than the use of chemicals or open-chest by-pass surgery which has been common in the past. Accordingly, the number of angioplasty procedures of this type has increased dramatically each year. For example, according to some reports, as recently as 1987 some 200,000 patients suffering from coronary artery disease were treated using angioplasty procedures. Since coronary artery disease remains the No. 1 cause of death in the United States, it can be expected to continue to play an important role in the treatment of coronary artery disease.

While angioplasty procedures have the above-stated advantages, exact control of the pressure used to inflate the balloon-tipped catheter is nevertheless essential to the safety of the patient. The duration of such inflations is also of major importance. When the balloon catheter is completely inflated in order to begin compressing the plaque, blood flow to the heart is temporarily shut off. This creates the potential for initiating cardiac arrest.

Accordingly, the pressure exerted on the artery by the balloon catheter, as well as the duration of the blockage created by inflating the balloon catheter, must both be carefully controlled by the attending cardiologist and other operating room personnel. The previous use of syringe systems equipped with conventional pressure gauges and human observation of stopclocks and the like is gradually giving way to a more sophisticated and effective method for monitoring balloon inflation pressure in an angioplasty procedure. The syringe used to apply fluid pressure to the balloon catheter is in these more sophisticated procedures placed in fluid-communication with a pressure-sensing transducer, and the output signal from the transducer is communicated to a monitor which can display both timing and pressure magnitude data.

For convenience, the pressure sensing transducer is usually located at the inflation syringe itself, while the monitor used to display pressure and timing data is located at a convenient position in the operating room at a distance from the inflation syringe which may vary from one operation to the other. The inflation syringe is part of the sterile field maintained in the operating room, while the monitor itself is of necessity located in the nonsterile field in the surgery rooms. Under such circumstances, a clear need exists to electrically interconnect the output signal from the pressure sensing transducer and the inflation syringe to the monitor in a manner which permits surgical personnel to vary the distance therebetween. At the same time, however, excess unused lengths of the flexible electric cord used for such a purpose can become a problem for the reasons already stated above. Thus, excessive lengths of such cord and of other wiring and tubing used in the operation can become a dangerous and distracting clutter. Such entanglements impede the efficient movement of interconnected equipment and become hazards susceptible to causing tripping or, due to snagging, causing inadvertent disconnection of the equipment involved. Major but subtle difficulties arise when stray lengths of such interconnecting members fall out of the sterile field of surgery and thus become themselves contaminated. For example, the interconnecting electrical cord used to communicate to transducer output signals to monitor can, if not carefully restrained, touch the floor or some other nonsterile piece of furniture. Thereafter, the cord will communicate contamination into the sterile field by contact with personnel or other loose cords and wires.

At the same time, however, there is a desire to afford the personnel conducting angioplastic procedures maximum flexibility in the amount of separation between items of equipment being used. The pressure monitor may be desirable at a greater or lesser distance from the inflation syringe, and any manner of coping with loose, excessive interconnection wiring must accommodate for this fact.

It is not uncommon in an angioplasty procedure to need to disconnect the equipment being utilized from the monitor therefor and later to reconnect these two pieces of equipment. Typically, this will occur when it is determined that a given balloon catheter is of the wrong size for the task to be performed. Then, it is necessary to withdraw the catheter, disconnecting the inflation syringe and the electrical wiring therefor. The equipment is moved to a sterile staging table where a catheter of the proper size is connected to the syringe. The new catheter, the syringe, and the interconnecting electrical wiring are then returned to the surgical table. The catheter is reinserted, and the electrical interconnection to the monitor is reestablished.

Nevertheless, in systems for interconnecting an angioplasty syringe to an electrical monitor, the acts of effecting coupling between the wiring, which is in the sterile field, and the monitor, which is in the nonsterile field, presents a challenge for the preservation of integrity of the sterile field. The individual who actually effects interconnection between the sterile cord and the nonsterile monitor is in the sterile field. Accordingly, it is necessary that the interconnection process be effectable without requiring that individual to contact the monitor. Adjustments of the monitor are, by contrast, usually made at the direction of surgical personnel by technicians who are not themselves in the sterile field. Nevertheless, where the sterile and nonsterile fields in the form of the sterile cord and the nonsterile monitor, respectively, are actually first interconnected, care is essential. The procedure can only be conducted by persons in the sterile field and then only if their contact with the nonsterile field is precluded.

Additionally, a system of interconnection for this purpose must include provisions for thereafter disconnecting the electrical coupling, and doing so entirely within the sterile field.

Thus, the control of excessive lengths of unused interconnection cabling, the preservation of the sterile field, and the provision of flexibility for affording electrical disconnection during surgery are concerns that call for equipment improvement and innovation.

BRIEF SUMMARY AND OBJECTS OF THE INVENTION

Accordingly, it is one object of the present invention to produce an apparatus for dispensing a required portion of a length of a flexible elongated interconnecting member, where the required length is less than the length of that elongated member fully available.

An associated object of the present invention is to manageably control and contain the unused portion of the length of flexible elongated interconnecting member.

Another object of the present invention is a system and method as described above, which is capable of use in dispensing and/or controlling wire, tubing, cording, or the like.

Additionally, it is an object of the present invention that the apparatus for controllably dispensing an elongated member as described above be simple and inexpensive to manufacture.

In medical applications, it is an object of the present invention to reduce the clutter confronting medical personnel in surgical settings that arises from unused lengths of flexible elongated interconnecting members.

In relation thereto, it is consequently an object of the present invention to improve the concentration of surgery room personnel, to reduce the possibility of inadvertent disconnection from or overturning of equipment due to snagging of unused lengths of such elongated members, and to facilitate flexibility in separating and moving medical equipment.

Yet another object of the present invention is to assist in the preservation of the sterile field in an operating room where it is nevertheless necessary to interconnect equipment to nonsterile sites, such as electronic monitors, and sources of power, pressure, vacuum or fluid in gaseous or liquid form.

It is an additional object of the present invention in the medical field of use is to flexibly permit the disconnection of a flexible interconnecting member in the sterile field after it has been coupled to a site in the nonsterile field, but without compromising the sterility of the interconnecting member.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an apparatus is provided for storing and controllably dispensing a flexible elongated member, such as a wire, a tube, a cord, or the like. The apparatus comprises a casing having a tubular body portion and first and second exit openings at opposite ends thereof. A flexible elongated member having first and second ends is disposed in the form of a tubular coil in the body portion coaxially therewith. In a preferred embodiment of the invention, the first end of the elongated member extends from a radially innermost layer of the windings of the coil through the first exit opening, while the second end of the elongated member extends through the second exit opening.

In a preferred arrangement of the elongated member in the coil, the first end of said elongated member extends longitudinally through the center of the coil from a winding of the coil at the end thereof opposite from the first exit opening. Optionally, but in addition thereto, the second end of the elongated member extends between the coil and the casing from a winding of the coil at the end thereof opposite from the second exit opening. In this manner, using the preferred arrangement of the elongated member in the coil, it is possible to unwind the elongated member from the radially innermost layer of windings of the coil by withdrawing the first end of the elongated member through the first exit opening.

In accordance with one aspect of the present invention, means are provided for restraining motion of the coil through the first and second exit openings. By way of example and not limitation, lateral walls can be provided at opposite ends of the casing with exit openings therethrough taking the form of slits or tubular necks projecting from the lateral walls outwardly from the casing and having inside diameters less than the outside diameter of the coil.

Alternatively, the means for retaining can take the form of ridges on the inner surface of the body portion conforming and in close proximity to the spaces between successive windings of the elongated member on the outer surface of the coil. Where the body portion is comprised of a heat shrinkable material, that material can be tightly fitted against the outer surface of the coil to retain it in the resulting casing. While a number of manners of winding the elongated member into the coil can adequately suffice in the context of the present invention, a preferred form of the coil thereof comprises a single layer of windings produced with the casing therefor in the method to be described subsequently.

In one form of the invention, both the first and second ends of the elongated member pass through an exit opening at one end of the casing. The opposite end of the casing may, accordingly, be closed, or include an exit opening through which no portion of the elongated member passes.

According to yet another aspect of the present invention, a method is provided for controllably dispensing an elongated member, such as a wire, a tube, a cord, or the like. The method comprises the steps of winding the elongated member about a mandrel to form a tubular coil, positioning a sleeve of heat shrinkable material coaxially about the coil with one of the free ends of the elongated member passing through each of the opposite ends of the sleeve, heating the sleeve to cause it to shrink in diameter into gripping engagement with the outer surface of the coil, and thereafter laterally removing the mandrel from the coil and casing to permit removal of a predetermined length of the elongated member from the coil by drawing one of the free ends thereof out of the casing.

In a preferred form of the method, which produces a coil of a single layer of windings, the step of winding comprises the subordinate steps of positioning a first free end of the elongated member adjacent and parallel to the mandrel, followed by winding the portion of the elongated member between the first and the other ends of the elongated member about the mandrel to form the coil. Finally, the other end of the elongated member is positioned against the outer surface of the coil oriented generally parallel thereto in a direction opposite to the orientation of the first free end of the elongated member. When such a coil is housed in any of the various casings generally described above, withdrawal of the first end of the elongated member from the casing enables unwinding of the elongated member from the center of the coil, while the second end of the elongated member is precluded until unwinding of the coil by withdrawing the first end of the elongated member is completed.

The invention additionally encompasses a system for operably interconnecting a first medical device with a second medical device using a flexible, elongated interconnecting member. The system can include one or a plurality of lengths of the elongated member having a portion of the length thereof wound into a tubular coil which is housed in a tubular casing of the type described above. Where plural lengths of such elongated members are employed, electrical connection means are provided for releasably and nondestructively electrically coupling each length of the elongated member to each other. As such electrical connection means would remain within the sterile field of the lengths of cord themselves, disconnection and reconnection can be effected by medical personnel without compromising sterility.

On the end of the one length of elongated member that is to be coupled to the nonsterile field, an interconnection means is provided for electrically interconnecting the length of cord by urging the interconnection means into engagement with a cooperating fitting on the device in the nonsterile field using a force that is applied to the interconnection means longitudinally aligned with the end of the length of said elongated member adjacent thereto.

According to another aspect of the present invention, means were provided for stiffening the length of the flexible member adjacent to such an interconnection means, thereby to permit the electrical interconnection of the interconnection means to the cooperating fitting without need for other contact with the nonsterile field.

By use of the system, method, and apparatus of the present invention, unmanageable, unused lengths of interconnecting members, such as wires, tubes, and cords, are manageably stored in a small space, while the portion of the length of the elongated member needed to effect interconnection can be controllably dispensed. In addition, the interconnection of the cord, when in the sterile field, to the unsterile field can by further teachings of the present invention be effected by an individual in the sterile field without compromise to that sterility. In addition, where plural interconnecting members are employed, devices may be disconnected temporarily to permit the adjustment or relocation of equipment and then reconnected, all within a single medical procedure and without compromising the sterile field for the procedure.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIGS. 3A-3F are a sequence of perspective views illustrating the method for manufacturing the dispenser shown in FIG. 2;

DETAILED DESCRIPTION OF THE PREFERRED EMBODIMENTS

Figure 1:
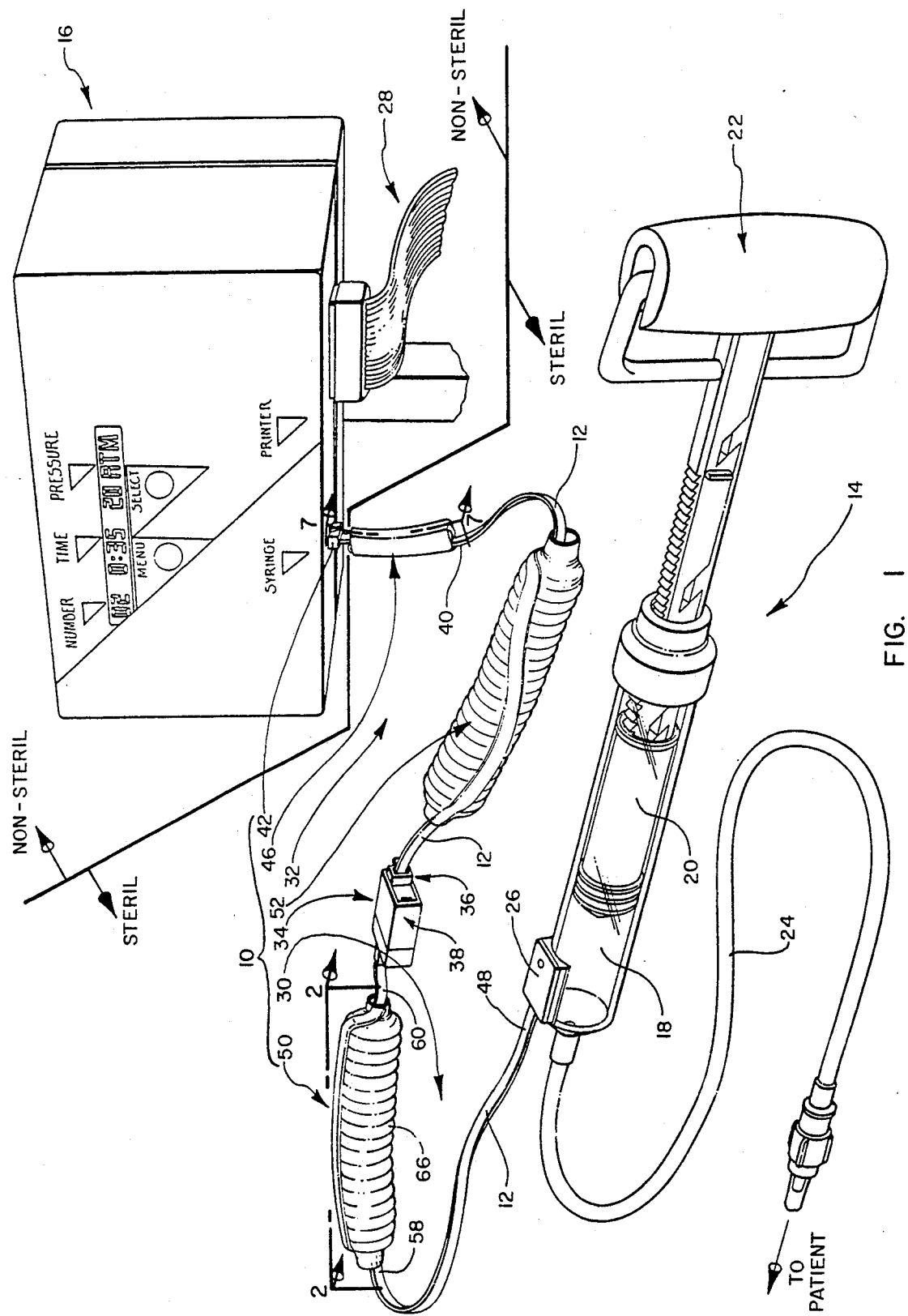
FIG. 1 is a perspective view of an angioplasty syringe and a monitor therefore electrically interconnected by a system incorporating teachings of the present invention.

As an example of an environment in the medical area in which the teachings of the present application have ready applicability, FIG. 1 illustrates typical elements of a system 10 for electrically interconnecting a first medical apparatus with a second medical apparatus using a flexible elongated interconnecting member.

In the case of system 10, the interconnecting member employed is a flat, flexible, insulated electric cord 12, which is shown interconnecting an angioplasty syringe 14 to an electronic monitor 16. Angioplasty syringe 14 includes a balloon-inflating chamber 18 containing a plunger 20 movable by handle 22. The pressure created in balloon-inflating chamber 18 is communicated through a hose 24 to the body of a patient for inflating a balloon tip catheter in an angioplastic procedure. Secured in a housing 26 at one end of balloon-inflating chamber 18 is a pressure sensing transducer (not shown) that is placed in fluid communication with the pressure in balloon-inflating chamber 18. It is the purpose of system 10 to communicate the output signal from such a pressure sensing transducer to monitor 16, where pressure and timing data are displayed and from which over cable 28 such data may be produced in printed form.

It should be understood that while in FIG. 1 the interconnected medical devices illustrated are specific to conducting an angioplastic procedure, any first and second medical devices, and indeed, any non-medical devices can be interconnected conveniently and safely according to the teachings of the invention. In addition, while the interconnection illustrated in FIG. 1 is for the purpose of communicating an electric signal, interconnections within the scope of the present invention would include interconnections designed to supply electric power, to communicate gaseous vacuum or pressure conditions, or to supply fluids in either or liquid or gaseous form. Thus, while in FIG. 1 electric cord 12 is shown as the flexible elongated interconnection member of system 10, other systems within the scope of the present invention would include flexible elongated interconnection members taking the form of tubing or wire in any of the diverse forms thereof.

As illustrated in FIG. 1, angioplasty syringe 14 and substantially all of the elements of system 10 are intended to remain within a sterile field, while monitor 16 is in a non-sterile field.

In overview, system 10 includes a plurality of lengths of cord 12, electrical connection means for selectably and releasably nondestructively coupling those lengths of cord 12, and an interconnection handle by which the end of system 10 that is to engage monitor 16 in the non-sterile field is coupleable therewith without requiring the individual effecting such coupling to make contact in the non-sterile field. Thus, system 10 includes a first length 30 of electric cord 12, a second length 32 of electric cord 12, and an electrical connection means for selectively and releasably coupling first and second lengths 30, 32 of electric cord 12.

Electrical connection means 34 can take the form of any number of known male-to-female electrical couplings, such as modular plug 36 and modular jack 38. While the inclusion in system 10 of a pair of lengths of electric cord 12 and an electrical connection means 34 therebetween permits the repeated coupling and non-destructive uncoupling of angioplasty syringe 14 from monitor 16 within the sterile field, and interconnection system according to the teachings of the present invention could comprise but a single length of electric cord 12 provided with some or all other features of the invention without sacrificing fully the benefits to be derived therefrom.

Typically, at the end 40 of second length 32 of electric cord 12, which is to be interconnected to monitor 16, there is an interconnection means, such as another modular plug 42, which engages a cooperating fitting 44 on monitor 16 when a force is applied to modular plug 42 longitudinally aligned with end 40 of second length 32 of electric cord 12. To assist in this process and in order to further the inventive object of permitting the process to be undertaken by an individual in the sterile field without making any contact in the non-sterile field, end 40 of second length 32 of electric cord 12 is provided with an interconnection handle 46 which will be described in additional detail hereafter in relation to FIG. 6.

The end 48 of first length 30 of electric cord 12 which is to be interconnected with angioplasty syringe 14 is permanently connected to the pressure sensing transducer thereof at housing 26. Nevertheless, such a permanent connection between either end of system 10 need not in all cases be a permanent one. Instead, the connection of end 48 of first length 30 of electric cord 12 to angioplasty syringe 14 could be effected using a freely coupleable and second length 30 of electric cord 12.

As the relative placement of angioplasty syringe 14 and monitor 16 will only be determinable at the time of surgery, in system 10 it is difficult to ascertain an appropriate length of electric cord 12 to include in either first or second lengths 30, 32, respectively, thereof. While the interests of flexibility would favor longer lengths of electric cord 12, even if an excess thereof is not utilized, the problems already discussed above that arise when unused lengths of such an elongated interconnecting member are lose in the surgical arena weight in favor or shorter lengths of electric cord 12. To accommodate both of these interests, system 10 includes structure capable of storing and controllably dispensing one or both of first and second lengths 30, 32, respectively, of electric cord 12.

Thus, according to another aspect of the invention, a first cord dispenser 50 is disposed in the course of first length 30 of electric cord 12 and a second cord dispenser 52 of substantially similar construction is disposed in the course of second length 32 of electric cord 12. It should be emphasized that the use of an apparatus, such as first cord dispenser 50, for storing and controllably dispensing a flexible elongated member, is not limited to the storage and dispensing of a cord, such as electric cord 12. Such an apparatus can be used to store and controllably dispense wire and tubes, as well as diverse forms of insulated electric cord. As first and second cord dispensers 50, 52 are substantially identical, the inner structure of each will be explored in detail only in relation to first cord dispenser 50. This will be undertaken in relation to the cross-sectional view of first cord dispenser 50 shown in FIG. 2.

Figure 2:
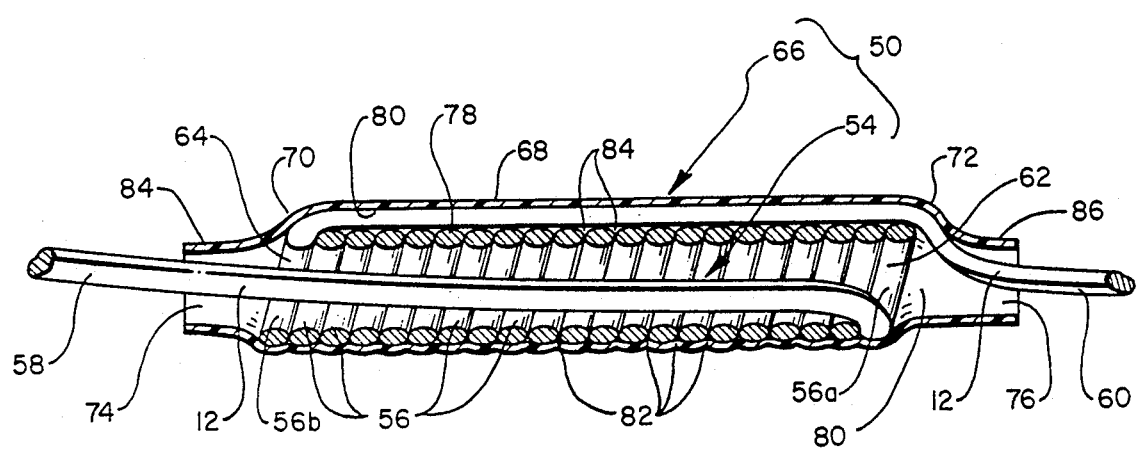
FIG. 2 is a cross-sectional elevation view of one of the dispensers for storing and controllably dispensing the cord used in the system shown in FIG. 1 taken along section line 2—2 shown therein.

As seen in FIG. 2, first cord dispenser 50 includes a portion of first length 30 of electric cord 12 wound into a tubular coil 54. In the embodiment shown in FIG. 2, coil 54 comprises a single layer of windings. It is possible in the context of the present invention and without departing from the teachings thereof to employ instead a coil of an elongated interconnection member that comprises a plurality of layers of windings one upon another. The coil need only be tubular in that, like tubular coil 54, the plural layers of the coil encircle a centrally disposed open space and one of these layers is readily definable as being radially innermost of the windings. In the instance of coil 54 which has but one layer of windings, that layer is by definition also the radially innermost layer of tubular coil 54.

For convenience of reference a portion of first length 30 of electric cord 12 forming coil 54 will be designated as having a first free end 58 and second free end 60. First free end 58 corresponds to end 48 of first length 30 of electric cord 12 which, in FIG. 1 is permanently coupled to angioplasty syringe 14. Correspondingly, second free end 60 corresponds to the end of first length 30 of electric cord 12 that terminates in modular jack 38 of electrical connection means 34.

While the particular manner in which coil 54 is wound constitutes a portion of the presently preferred embodiment of a cord dispenser, other forms of winding, either cords, tubes, or wires into a coil for incorporation into a dispenser of such flexible elongated interconnection members in entirely within the scope of the present invention. Alternative forms of such windings for an elongated interconnecting member will be illustrated and discussed subsequently in relation to FIGS. 4 and 6.

Nevertheless, for the present it can be observed from FIG. 2 that in coil 54, first free end 58 of electric cord 12 extends from first end 62 of coil 54 longitudinally through the center of coil 54 from first end 58 to second end 60 thereof. At first end 58 of coil 54 first free end 58 is joined to the radially innermost layer, namely, in this case, the only layer of windings 56 of coil 54. On the other hand, it can also be seen in FIG. 2 that second free end 60 of electric cord 12 is joined to windings 56 at second end 64 of coil 54. From that location second free end 60 passes on the outside of coil 54, between coil 54 and casing 66, to first end 62 of coil 54. In this manner, first free end 58 and second free end 60 of first cord dispenser 50 lie in generally parallel but oppositely directed courses, one inside and one outside of coil 54.

First cord dispenser 50 also includes a tubular casing 66 disposed coaxially with and circling coil 54. Casing 66 comprises a centrally located tubular body portion 68 having lateral walls 70, 72 with first exit opening 74 and second exit opening 76 formed therethrough respectively at opposite ends thereof.

After passing longitudinally through the radial center of coil 54, first end 58 of electric cord 12 exits casing 66 through first exit opening 74. Correspondingly, second free end 60 of electric cord 12 passes between outside surface 78 of coil 54 and inner surface 80 of casing 66 before exiting casing 66 through second exit opening 76. Unwinding of electric cord 12 to controllably dispense portions thereof as needed is effected by withdrawing first end 58 of electric cord 12 through first exit opening 74. In doing so winding 56a on the end of coil 54 opposite from first exit opening 74 is withdrawn from dispenser 50 in a process which will continue to dispense electric cord 12 from successive windings 56 at first end 62 of coil 54.

Second free end 60 of electric cord 12, by contrast, cannot be Withdrawn from casing 66 until unwinding of coil 54 is completed in the manner described. Second free end 60 of electric cord 12, which is attached to winding 56b at second end 64 of coil 54 opposite from second exit opening 76, passes out of casing 66 on the outside of coil 54. Also where casing 66 tightly encircles coil 54 second free end 60 of electric cord 12 is impaled therebetween.

Casing 66 can be constructed of a number of materials in a variety of different manners. For example, casing 66 could be comprised of adhesive tape or an elastic sleeve that is applied to coil 54 so as to be in tension thereabout. As shown in FIG. 2, casing 66 comprises a heat-shrinkable material that has been heated to grippingly engage outer surface 78 of coil 5. In the process except along the course of second free end 60 of electric cord 12 the walls of casing 66 form ridges 82 on at least the inner surface of body portion 68 thereof. Ridges 82 are thus conforming and in close proximity to the spaces 84 between successive windings 56 of electric cord 12 on the outer surface 78 on coil 54. In the process of diametrically shrinking casing 66 into engagement with coil 54 diametrically narrowed tubular necks 84, 86 are integrally formed with lateral walls 70, 72. Tubular necks 84, 86 project outwardly from casing 66 and terminate in first exit opening 74 and second exit opening 76, respectively.

According to one aspect of the present invention, a dispenser, such a first cord dispenser 50, is provided with means for restraining coil 54 from motion through either said first exit opening 74 or said second exit opening 76. In this manner it is possible to unwind the elongated member in the coil by withdrawing, for example, first free end 58 of electric cord 12 through first exit opening 74.

At least three mechanisms visible in FIG. 2 function to restrain coil 54 within casing 66. First, inner surface 80 of casing 66 is in a tight compressive fit against outer surface 78 of coil 54. This provides at least a frictional resistance to lateral movement of coil 54 within or out of casing 66.

In addition, however, ridges 82 on inner surface 80 of casing 66 by fitting into spaces 84 between successive windings 56 of coil 54 form a locking arrangement also preventing lateral movement of coil 54. Ridges, such as ridges 82, need not be formed on the interior of a casing, such as casing 66, due to the action of heat-shrinking the casing against the outside surface of a coil, such as coil 54. Ridges 82 could alternatively be so formed by molding or embossing techniques. Finally, lateral motion of coil 54 out of casing 66 is curtailed due to the presence of lateral walls 70, 72 and tubular necks 84, 86 which have inner diameters less than the outer diameter of coil 54. Naturally, all of the above-described mechanisms for restraining lateral motion of coil 54 need not be included in any single given embodiment of a cord dispenser according to the teachings of the present invention.

Another manner in which lateral motion of coil 54 would be constrained to bond a portion of the outer surface 78 of coil 54 to inner surface 80 of casing 66 using ultrasonic welding, an adhesive, or the like. The area of bonding need not be substantial. A small spot of adhesive on second free end 60 of electric cord 12, where it contracts casing 66, has been found to suffice.

The arrangement shown in FIG. 2 not only restrains coil 54 from motion through either first or second exit openings 74, 76, respectively, but enables the unwinding of electric cord 12 from coil 54 by withdrawing first free end 58 of electric cord 12 through first exit opening 74. Doing so results in the withdrawal of successive of windings 56, beginning at first end 62 of coil 54. On the other hand, second free end 60 of electric cord 12 is by its positioning between inner surface 80 of casing 66 and outer surface 78 of coil 54 precluded from withdrawal from casing 66 until unwinding of coil 54 by withdrawing first end 58 of electric cable 12 is completed. Thus, in the embodiment shown in FIG. 2 in contrast to other embodiments to be described subsequently, electric cord 12 is controllably dispensable from only one end of first cord dispenser 50.

Returning to FIG. 1 momentarily, this result will be seen to have salutary consequences in that because second free end 60 cannot be withdrawn from casing 66, first cord dispenser 50 will remain in the same position relative to modular jack 38, regardless of how much of the length of electrical cord 12 is dispensed by withdrawing first free end 58 thereof from casing 66. Thus, surgical personnel working with system 10 will reliably find first cord dispenser 50 proximate to electrical connection means 34. Similarly, second cord dispenser 52 will be found in close proximity to electrical connection means 34, regardless of how much of second length 32 of electric cord 12 is withdrawn therefrom on the end thereof adjacent to monitor 16. Naturally, this one-way withdrawal capacity in the dispensers illustrated in FIG. 1 could be reversed in either or both first and second cord dispensers 50, 52, respectively, depending upon the objective sought.

The cord dispenser illustrated in FIGS. 1 and 2 thus provide for convenient storage of unused portions of electric cord 12, keeping those unused portions out form under foot, away from tangling with other such unused lengths of elongated interconnection members, and free from being snagged by individuals in the immediate environment. On the other hand, such dispensers afford maximum flexibility in arranging the spacing between devices to be interconnected by electric cord 12 for the convenience of the user. It is considered that these consequences will result in a surgical environment that is less confusing and less likely to result in accidents to medical personnel or equipment.

The manner in which the embodiment of a cord dispenser illustrated in FIG. 2 is manufactured will be described in relation to FIGS. 3A-3F. In FIGS. 3A-3F, however, it is well to note that the left-to-right orientation of the structure shown is reversed in relation to the view existing in FIG. 2. Nevertheless, wherever appropriate identical reference characters will be used to identify identical structures in FIG. 2 and in FIGS. 3A-3F.

The construction of a cord dispenser, such as first cord dispenser 50, begins with a solid central mandrel 90, which may have a prismatic cross-section. Mandrel 90 in FIG. 3A has a circular cross-section. The circular form of mandrel 90 is preferred in most instances as likely to avoid unnecessarily sharp kinking of the cord to be dispensed. Nevertheless, mandrels having regular or irregular prismatic shapes will merely result in coils and casings therefor with similar shapes. Thus, it is within the contemplated scope of the present invention to produce cord dispensers, such as first cord dispenser 50 having square, triangular, or even hexagonal cross-sections.

Basically, the elongated member which is to be stored in the dispenser to be made using mandrel 90 is wound thereabout to form a tubular coil. As shown in FIG. 3B, first free end 58 of electric cord 12 is positioned adjacent and parallel to mandrel 90. Thereafter, windings 56 are begun about mandrel 90 and first free end 58 disposed thereagainst. This process is continued along mandrel 90 until the full length of coil 54 has been deposited thereupon. As can be seen, the plurality of windings 56 with spaces 84 therebetween has an outer surface 78. As further seen in FIG. 3C, second free end 58 of electric cord 12 is then positioned against outer surface 78 of coil 54 oriented generally parallel thereto in a direction opposite to the orientation of second free end 60 of electric cord 12.

Figure 3D:
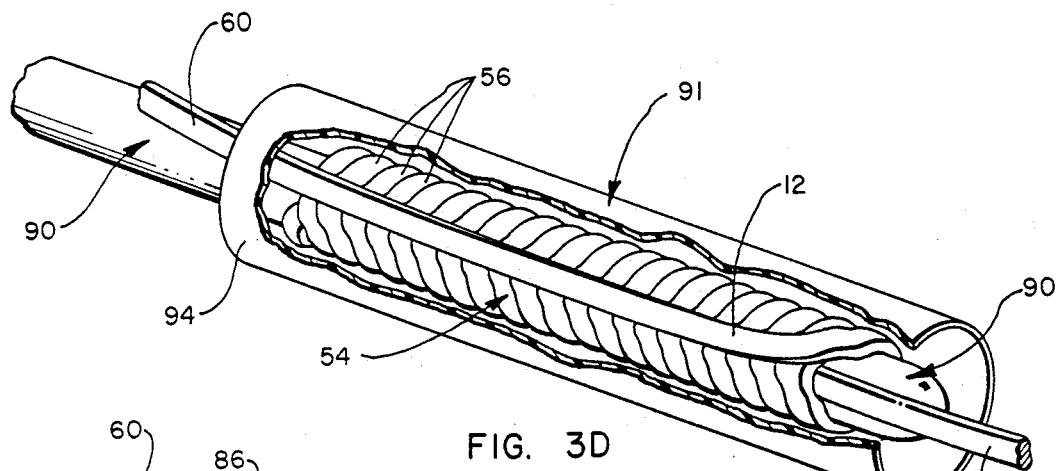

To complete first cord dispenser 50, and as seen in FIG. 3D, a sleeve 91 of heat-shrinkable material is coaxially positioned about coil 54 with first and second free ends 58, 60, respectively, of electric cord 12 passing out of opposite ends 92, 94 of sleeve 90.

Figure 3E:
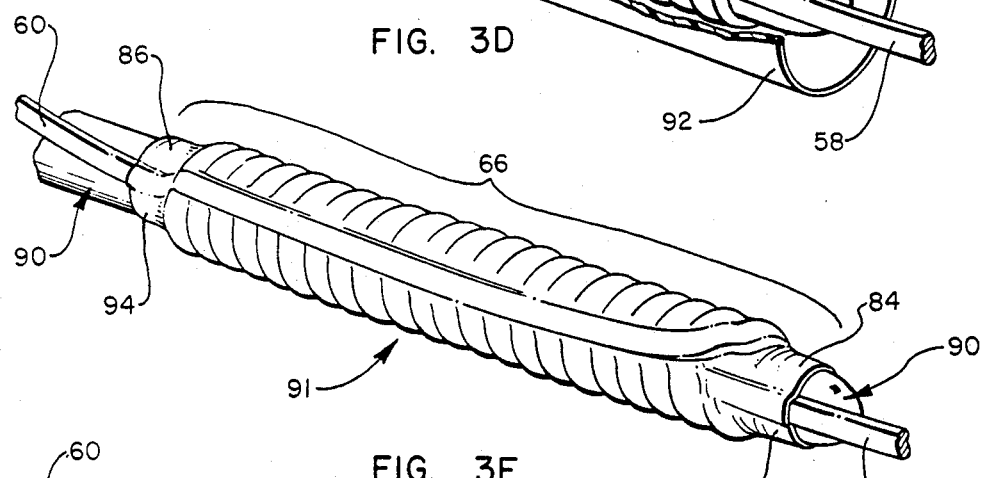

Thereafter sleeve 91 is heated, causing it to shrink in diameter into gripping engagement with outer surface 78 of coil 54 and with mandrel 90 at opposite ends of coil 54, forming casing 66 thereabout, as is shown in FIG. 3E.

Figure 3F:
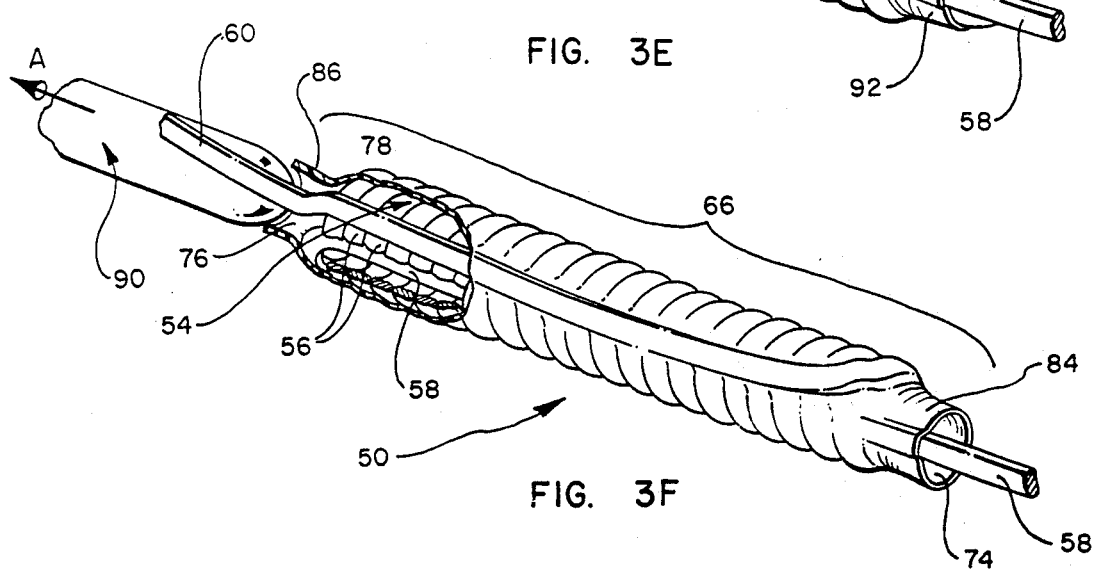

Finally, as shown in FIG. 3F, mandrel 90 is laterally removed from the assembly in the direction shown by arrow A. In FIG. 3F a portion of casing 66 and some of the windings 56 of coil 54 have been broken away in order to illustrate first end 58 of electric cord 12 passing through the radial center of coil 54 and out of casing 66 through first exit opening 74. In addition second free end 60 of electric cord 12 can be seen held between outer surface 78 of coil 54 and casing 66 as second free end 60 traverses the length of first cord dispenser 50 to exit from casing 66 at second exit opening 76 thereof.

Figure 4:
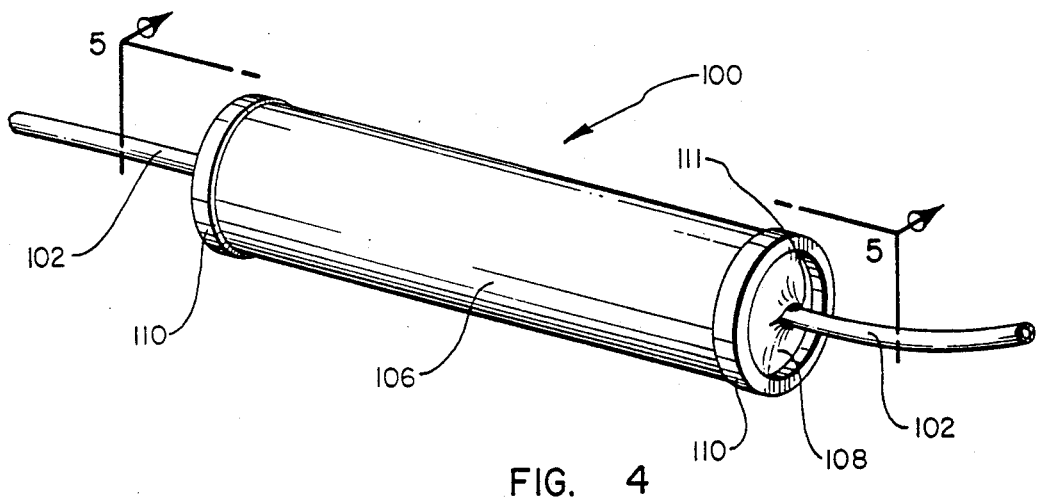
FIG. 4 is a perspective view of a second embodiment of a dispenser for storing and controllably dispensing an elongated member, such as the dispenser shown in FIG. 2.
Figure 5:
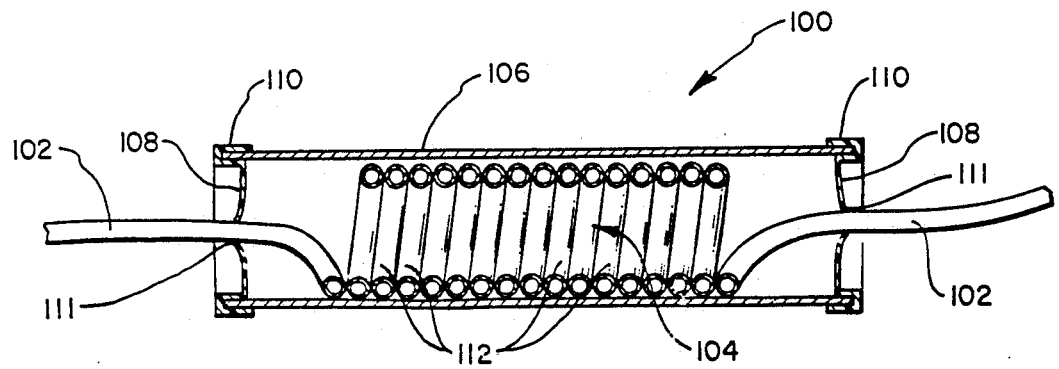
FIG. 5 is a cross-sectional elevation view of the dispenser shown in FIG. 4 taken along section line 5—5 shown therein.

FIGS. 4 and 5 illustrate a second embodiment of a dispenser 100 configured according to the teachings of the present invention for storing and controllably dispensing a flexible elongated interconnection member, which in the case of the elongated member shown in FIG. 4 takes the form of a hollow tube 102, such as might be used to administer intravenous nourishment or fluid or to periodically take tests of body fluids. Dispenser 100 includes a tubular coil 104 of tubing 102 disposed within a cylindrical housing 106 and having flexible lateral walls 108. Windings 112 of coil 104 are disposed in a single layer, free ends 114 of tubing 102 do not as in the dispenser embodiment shown in FIGS. 1 and 2 leave windings 112 of coil 104 traversing the length of coil 104 or cylindrical housing 106, either at the radial center of coil 104 or between coil 104 and cylindrical housing 106. Accordingly, no one-way withdrawal characteristic exists in dispenser 100 as was the case in first cord dispenser 50 shown in FIGS. 1 and 2. This merely means that tubing 102 can be withdrawn from dispenser 100 through either end thereof.

Formed in each lateral wall 108 is a slit 111 through which the free ends of tubing 102 may exit cylindrical housing 106. Where the material of lateral wall 108 is pliable enough to admit tubing 102 through a narrow slit without pinching tubing 102 shut, slit 111 can be very narrow. On the other hand, if the material of lateral wall 108 is rigid, an opening at least the size of the outer diameter of tubing 102 should be employed in place of a slit.

It should be noted that in dispenser 100 cylindrical housing 106 can be a self sustaining structure which does not bear tightly against the outer surface of coil 104. Thus, coil 104 is susceptible to lateral sliding within cylindrical housing 106, but will be restrained from sliding out of cylindrical housing 106 by lateral walls 108.

Figure 6:
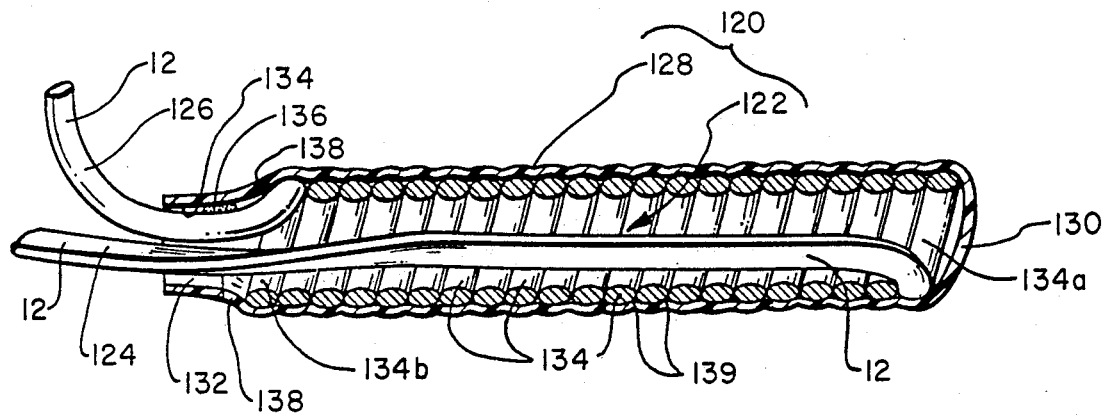
FIG. 6 is a cross-sectional elevation view of a third embodiment of a dispenser for storing and controllably dispensing an elongated member, such as the dispenser shown in FIG. 2.

FIG. 6 depicts in cross-section a third embodiment of a dispenser 120 for storing and controllably playing out any desired portion of a length of an elongated interconnection member. In the case of FIG. 6, such an interconnection member is shown as electric cord 12 disposed in the form of a tubular coil 122 and having for purposes of reference a first end 124 and a second end 126. Coil 122 is coaxially disposed in a tubular casing 128. In contrast to the casings previously disclosed in relation to the embodiments of a dispenser detailed in FIGS. 2, 4, and 5, however, casing 128 is closed at one end 130 thereof and has but one exit opening 132 at the end opposite thereto.

Coil 122 is comprised of a single layer of windings 134. First end 124 of electric cord 12 extends from a winding 134a at the end of coil 122 opposite from exit opening 132 longitudinally through the center of coil 122 and out of casing 128 through exit opening 132. By this arrangement, unwinding of electric cable 12 can be achieved by withdrawing first end 124 thereof through exit opening 132. Doing so will extract windings 134 from dispenser 120 beginning with winding 134a and continuing along the length of coil 122 until electric cable 12 is fully removed therefrom.

Second end 126 of electric cable 12 passes from a winding 134b of coil 122 located adjacent to exit opening 132 directly through exit opening 132. The withdrawal of second end 126 of electric cord 12 will remove from dispenser 120 winding 134b and successive windings 134 of coil 122 adjacent thereto. Nevertheless, in the process, each such winding 134 withdrawn from second end 126 of electric cord 12 will form a corresponding twist around first end 124 thereof. After several such windings 134 have been removed in this manner, the resulting entanglement may prove entirely dysfunctional. Accordingly, where the embodiment of a dispenser 120 as shown in FIG. 6 is to be employed, it is recommended that second end 126 of electric cord 12 be prevented from being withdrawn from casing 128 at all. This can be accomplished by bonding second end 126 of electric cord 12 to the interior surface 134 thereof using spot bonding, such as an ultrasonic weld or an adhesive, as indicated schematically by reference character 136.

In another aspect of the invention, dispenser 120 is provided with means for restraining motion of coil 122 through exit opening 132. The structures for accomplishing this end are similar to those found in dispenser 150 shown in FIG. 2. These could include not only the provision of a bonding site between coil 122 and casing 128 as identified schematically by reference character 136, but lateral walls 138 at the end of casing 128 in which exit opening 132 is formed. If $ casing 128 is formed of an elastic or a heat-shrinkable material, the tight fit of casing 128 on the exterior of coil 122 or ridges 139 that conform and are in close proximity to the spaces between successive windings 134 of electric cord 12 on the outer surface of coil 122, will restrain movement of coil 122. Naturally in place of casing 128 with one exit opening, a casing with two exit openings on opposite ends thereof could be employed in dispenser 120 by only utilizing one exit opening thereof.

Returning to FIG. 1, it will be recalled that end 40 of second length 32 of electric cord 12 is provided with a modular plug 42 which is coupleable to monitor 16 upon being urged into engagement with a cooperating fitting thereon. In order to so urge modular plug 42 into engagement with this fitting, it is necessary to apply a force to modular plug 42 which is longitudinally aligned with end 40 of second length 32 of electric cord 12. As electric cord 12 is in many instances very flexible, problems are presented in effecting such a coupling without by inadvertent or design having the fingers of the individual effecting the coupling contact monitor 16 in the vicinity of the cooperating fitting that receives modular plug 42.

Accordingly, in another aspect of the present invention, means are provided for stiffening electric cord 12 adjacent to modular plug 42 to permit engagement of modular plug 42 with the cooperating fitting on monitor 16 without the need for other contact with that medical device. In this manner, the sterility of the individual effecting such contact will be preserved.

Figure 7:
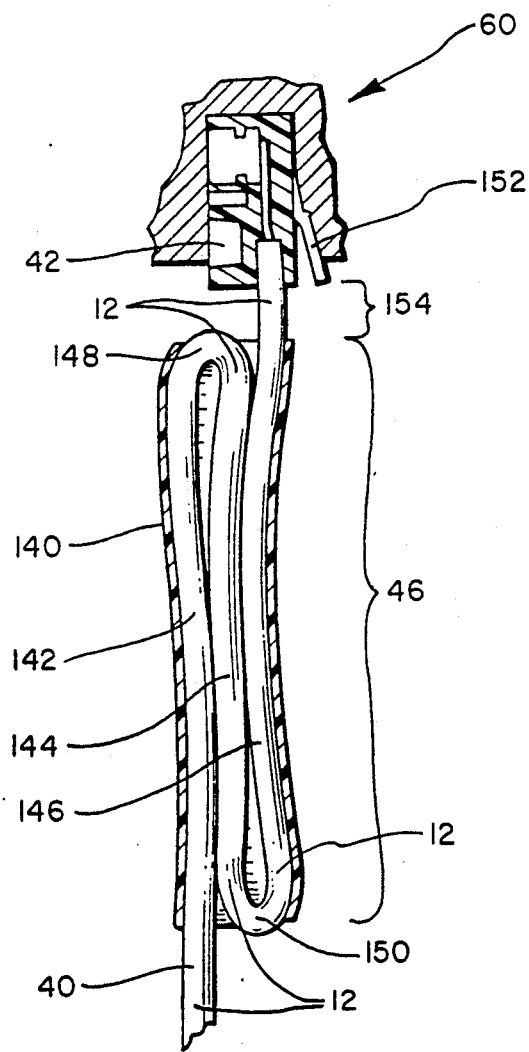
FIG. 7 is a cross-sectional view of the coupling handle used to facilitate sterile coupling of a cord to a nonsterile monitor taken along section line 7—7 appearing in FIG. 1.

As shown by way of example and not limitation, and as mentioned earlier in relation to the discussion of FIG. 1, end 40 of second length 32 of electric cord 12 is provided with an interconnecting handle 46 which is shown in additional detail in the cross-sectional view of FIG. 7. Interconnection handle 46 comprises a sleeve 140 in tight encirclement about a portion of electric cord 12 adjacent to modular plug 42. Within sleeve 140 the course of electric cord 12 comprises a double switch-back, thereby to retain in sleeve 140 at least three parallel, serially interconnected lengths 142, 144, 146 of electric cord 12. Between lengths 142 and 144 is a bend 148 in which electric cord 12 doubles back upon itself. Similarly, between lengths 144 and 146 is a bend 150 in electric cord 12.

Sleeve 140 may be comprised of an adhesive tape or an elastic material that fits in tension about the interconnected lengths of electric cord 12. Preferably, however, sleeve 140 is formed of a heat-shrinkable material contracted into tight engagement with lengths 142, 144, and 146 of electric cord 12.

The effect of the interconnection handle 46 on the process of coupling modular plug 42 with the cooperating fitting on monitor 16 is to add sufficient strength to end 40 of second length 32 of electric cord 12 that force can be applied to modular plug 42 in a direction longitudinally aligned with end 40 of second length 32 of electric cord 12. This is accomplished merely by grasping interconnection handle 46 and urging modular plug 42 into engagement with the cooperating fitting. Bends 148, 150 contribute to a slight enlargement of interconnection handle 46 at each end of sleeve 140 resulting in an ergonomically satisfying thumb grip.

Preferably, the detent lever 152 associated with modular plug 42 is located toward the side of length 146 opposite from lengths 142 and 144 of electric cable 12. In this manner clear access is afforded to detent lever 152 for disconnecting modular plug 42. Where disposition of detent lever 152 on the side of length 146 of electric cord 12 adjacent to lengths 142 and 144 of electric cord 12 such access would be impaired.

In addition, a small gap 154 is left between interconnection handle 46 and modular plug 42 wherein electric cord 12 is not surrounded by sleeve 140. Gap 154 affords a degree of clearance between the fingers of an individual using interconnection handle 46 and monitor 16 itself. Nevertheless, gap 154 must be short enough that the length of electric cord 12 therein does no buckle when a force is applied longitudinally aligned therewith.

Thus, system 10 as shown in FIG. 1 includes a number of features which should bring enhanced flexibility to the placement and interconnection of medical equipment. The use of interconnection handle 46 permits an individual in the sterile field to connect system 10 to a non-sterile piece of medical equipment, such as monitor 16. Thereafter electrical connection means 34 between first and second lengths 30, 32, respectively, of electric cord 12 affords for disconnecting and reconnecting of the two medical devices shown without leaving the sterile field. The cord dispensers located in each length of electric cord 12 store unneeded portions of each of these lengths of electric cord 12, while permitting the controlled dispensing of such amounts of electric cord 12 as do position the interconnected medical equipment wherever desired. This contributes to the safety and sterility in that environment.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for operably interconnecting a first medical device with a second medical device using a flexible, elongate member, said system comprising:
   a. a length of the elongated member having first and second free ends and being wound into a tubular coil;
   b. first interconnection means on said first end of said length of the elongated member for operably interconnecting said elongated ember to said first medical device;
   c. second interconnection means on said second end of said length of the elongated member for operably interconnecting the elongated member to said second medical device;
   d. a tubular casing of heat shrinkable material having a body portion and at least one exit opening, said body portion coaxially encircling said coil and substantially engaging the outer surface of said coil with said first and second free ends of said elongated member extending from said casing through said at least one opening; and
   e. ridges formed on the inner surface of said body portion substantially conforming to and in close proximity to space between successive windings of said elongated member on the outer surface of said coil for restraining motion of said coil through said at least one exit opening, thereby to enable unwinding of said elongated member from a radial center of said coil by withdrawing at least one of said first end and said second end of said elongated member through said at least one exit opening.

2. A system as recited in claim 1, wherein said first interconnection means is operably interconnectable to said first medical device by urging said first interconnection means into engagement with a cooperating fitting on said first medical device using a force applied to said first interconnection means in longitudinal alignment with said first end of said elongated member, and wherein said system further comprises means for stiffening said elongated member adjacent to said first interconnection means to permit engagement thereof with said cooperating fitting and avoid other contact with said first medical device.

3. A system as recited in claim 2, wherein said means for stiffening comprises a sleeve in tight encirclement about a portion of said elongated member adjacent to said first interconnection means.

4. A system as recited in claim 3, wherein the course of said elongated member within said sleeve comprises a double switch-back, thereby to retain in said sleeve at least three parallel, serially interconnected lengths of said elongated member.

5. A system as recited in claim 3, wherein said sleeve is comprised of a heat-shrinkable material contracted into engagement with said elongated member.

6. A system as recited in claim 1, wherein said tubular casing further comprises lateral walls at opposite ends of said casing, said at least one exit opening being formed through each said lateral walls.

7. A system as recited in claim 1, wherein said first end of said elongated member extends from a radially innermost layer of the windings of said coil longitudinally through the center of said coil from a winding of said coil at the end thereof opposite said at least one opening.

8. A system as recited in claim 1, wherein said cross-sections of said coil and of the inner surface of said body portion are circular.

9. A system for operably interconnecting a first medical device with a second medical device using a flexible, elongated member, said system comprising:
 a. a length of the elongated member having first and second free ends and being wound into a tubular coil;
 b. first interconnection means on said first end of said length of the elongated member for operably interconnecting said elongated member to said first medical device;
 c. second interconnection means on said second end of said length of the elongated member for operably interconnecting the elongated member to said second medical device;
 d. a tubular casing of heat shrinkable material having a body portion and first and second exit openings at opposite ends thereof, said body portion coaxially encircling said coil and substantially engaging the outer surface of said coil with said first and second free ends of said elongated member extending from said casing through said first and second exit openings, respectively; and
 e. ridges formed on an inner surface of said body portion substantially conforming and in close proximity to space between successive windings of said elongated member on an outer surface of said coil, such that motion of said coil is restrained through said first and second exit openings, thereby to enable unwinding of said elongated member from a radial center of said coil by withdrawing said first end of said elongated member through said first exit opening.

10. A system as recited in claim 9, wherein said first interconnection means is operably interconnectable to said first medical device by urging said first interconnection means into engagement with a cooperating fitting on said first medical device using a force applied to said first interconnection means in longitudinal alignment with said first end of said elongated member, and wherein said system further comprises means for stiffening said elongated member adjacent to said first interconnection means to permit engagement thereof with said cooperating fitting and avoid other contact with said first medical device.

11. A system as recited in claim 10, wherein said means for stiffening comprises a sleeve in tight encirclement about a portion of said elongated member adjacent to said first coupling means.

12. A system as recited in claim 11, wherein the course of said elongated member within said sleeve comprises a souble switch-back, thereby to retain in said sleeve at least three parallel, serially interconnected lengths of said elongated member.

13. A system as recited in claim 11, wherein said sleeve is comprised of a heat-shrinkable material contracted into engagement with said elongated member.

14. A system as recited in claim 9, wherein said tubular casing further comprises lateral walls at opposite ends of said casing, said first and second exit openings each being formed individually through one of said lateral walls.

15. A system as recited in claim 9, wherein said first end of said elongated member extends from a radially innermost layer of the windings of said coil longitudinally through the center of said coil from a winding of said coil at the end thereof opposite said first exit opening.

16. A system as recited in claim 9, wherein said second end of said elongated member extends between said coil and said casing from a winding of said coil at the end thereof opposite from said second exit opening.

17. A system as recited in claim 16, wherein said cross-sections of said coil and of the inner surface of said body portion are circular.

18. A system for operably interconnecting a first medical device with a second medical device using a flexible, elongated member, said system comprising:
 a. a length of the elongated member having first and second free ends and being wound into a tubular coil;
 b. first interconnection means on said first end of said length of the elongated member for operably interconnecting said elongated member to said first medical device;
 c. second interconnection means on said second end of said length of the elongated member for operably interconnecting the elongated member to said second medical device;
 d. a tubular casing having a body portion and an exit opening, said body portion coaxially encircling said coil with said first and second free ends of said elongated ember extending from said casing through said exit opening; and
 e. ridges formed on an inner surface of said body portion substantially conforming and in close proximity to space between successive windings of said elongate member on an outer surface of said coil, such that motion of said coil is restrained through said exit opening, thereby to enable unwinding of said elongated member from a radial center of said coil by withdrawing at least one of said first end and said second end of said elongated member through said exit opening.

19. A system as recited in claim 18, wherein said first interconnection means is operably interconnectable to said first medical device by urging said first interconnection means into engagement with a cooperating fitting on said first medical device using a force applied to said first interconnection means in longitudinal alignment with said first end of said elongated member, and wherein said system further comprises means for stiffening said elongated member adjacent to said first interconnection means to permit engagement thereof with said cooperating fitting and avoid other contact with said first medical device.

20. A system as recited in claim 19, wherein said means for stiffening comprises a sleeve in tight encirclement about a portion of said elongated member adjacent to said first coupling means.

21. A system as recited in claim 20, wherein the course of said elongated member within said sleeve comprises a double switchback, thereby to retain in said sleeve at least three parallel, serially interconnected lengths of said elongated member.

22. A system as recited in claim 20, wherein said sleeve is comprised of a heat-shrinkable material contracted into engagement with said elongated member.

23. A system as recited in claim 18, wherein said tubular casing further comprises a lateral wall at one end of said casing, said exit opening being formed through said lateral wall.

24. A system as recited in claim 18, wherein said first end of said elongated member extends from a radially innermost layer of the windings of said coil longitudinally through the center of said coil from a winding of said coil at the end thereof opposite said exit opening.

25. A system as recited in claim 18, wherein said second end of said elongated member extends from a winding of said coil nearest said exit opening.

26. A system as recited in claim 18, wherein said cross-sections of said coil and of the inner surface of said body portion are circular.

27. A system for electrically interconnecting a first medical device with a second medical device using a flexible, insulated electric cord, said system comprising:
 a. a first length of the cord having first and second free ends and being electrically interconnected at said first end thereof to the first medical device;
 b. a second length of the cord distinct from said first length thereof and having first and second free ends;
 c. first interconnection means on said first end of said second length of the cord for electrically interconnecting said second length of the cord to the second medical device by urging said first interconnection means into engagement with a cooperating fitting on said second medical device using a force applied to said first interconnection means longitudinally aligned with said first end of said second length of the cord;
 d. cord connection means for releasably electrically coupling said second free ends of said first and second lengths of the cord; and
 e. means for stiffening said second length of said cord adjacent to said first interconnection means to electrically interconnect said first interconnection means to said cooperating fitting and avoid all other contact with said second medical device.

28. A system as recited in claim 27, further comprising a first cord dispenser disposed in the course of said first length of the cord, said first cord dispenser comprising:
 a. a portion of said first length of said cord wound into a tubular coil;
 b. a tubular casing having first and second exit openings at opposite ends thereof, said first casing comprising a sleeve of heat-shrinkable material coaxially encircling said coil with the inner surface of said casing being in gripping engagement with the outer surface of said coil, one end of said first length of the cord extending from a radially innermost layer of the windings of said coil longitudinally through the center of said coil to said first exit opening, and the other end of said first length of the cord extending through said second exit opening, said coil being restrained from motion through said first and second exit openings, thereby enabling the unwinding of said first length of the cord from said coil by withdrawing said one end of said first length of the cord through said first exit opening.

29. A system as recited in claim 28, wherein said one end of said first length of the cord corresponds to said first free end thereof.

30. A system as recited in claim 28, wherein said one end of said first length of the cord corresponds to said second free end thereof.

31. A system as recited in claim 27, further comprising a second cord dispenser disposed in the course of said second length of the cord, said second cord dispenser comprising:
 a. a portion of said second length of the cord wound into a tubular coil;
 b. a tubular casing having first and second exit openings at opposite ends thereof, said casing comprising a sleeve of heat-shrinkable material coaxially encircling said coil with the inner surface of said casing being in gripping engagement with the outer surface of said coil, one end of said second length of the cord extending from a radially innermost layer of the windings of said coil longitudinally through the center of said coil to said first exit opening, and the other end of said second length of the cord extending through said second exit opening, said coil being restrained from motion through said first and second exit openings, thereby enabling the unwinding of said second length of the cord from said coil by withdrawing said one end of said second length of the cord through said first exit opening.

32. A system as recited in claim 31, wherein said one end of said second length of the cord corresponds to said first free end thereof.

33. A system as recited in claim 31, wherein said one end of said second length of the cord corresponds to said second free end thereof.

34. A system as recited in claim 27 further comprising:
 a. a first cord dispenser disposed in the course of said first length of the cord, said first cord dispenser comprising:
  i. a portion of said first length of said cord wound into a tubular coil;
  ii. a tubular casing having first and second exit openings at opposite ends thereof, said first casing comprising a sleeve of heat-shrinkable material coaxially encircling said coil with the inner surface of said casing being in gripping engagement with the outer surface of said coil, one end of said first length of the cord extending from a radially innermost layer of the windings of said coil longitudinally through the center of said coil to said first exit opening, and the other end of said first length of the cord extending between said coil and said inner surface of said casing and through said second exit opening, said coil being restrained from motion through said first and second exit openings, thereby enabling the unwinding of said first length of the cord from said coil by withdrawing said one end of said first length of the cord through said first exit opening; and b. a second cord dispenser disposed in the course of said second length of the cord, said second cord dispenser comprising:
  i. a portion of said second length of the cord wound into a tubular coil;
  ii. a tubular casing having first and second exit openings at opposite ends thereof, said casing comprising a sleeve of heat-shrinkable material coaxially encircling said coil with the inner surface of said casing being in gripping engagement with the outer surface of said coil, one end of said second length of the cord extending from a radially innermost layer of the windings of said coil longitudinally through the center of said coil to said first exit opening, and the other end of said second length of the cord extending between said coil and said inner surface of said casing through said second exit opening, said coil being restrained from motion through said first and second exit openings, thereby enabling the unwinding of said second length of the cord from said coil by withdrawing said one end of said second length of the cord through said first exit opening.

35. A system as recited in claim 27, wherein said means for stiffening comprises a sleeve in tight encirclement about a portion of said second length of the cord member adjacent to the first interconnection means.

36. A system as recited in claim 35, wherein the course of said second length of the cord within said sleeve comprises a double switch-back, thereby to retain in said sleeve at least three parallel serially interconnected lengths of said second length of cord.

37. A system as recited in claim 36, wherein said sleeve is comprised of a heat-shrinkable material contracted into engagement with said second length of the cord.

38. A system as recited in claim 27, wherein said first end of said first length of the cord is permanently electrically interconnected to said first medical device.

39. A system as recited in claim 38, wherein said first medical device is a balloon-inflating angioplasty syringe, and wherein said second medical device is a monitor of the pressure in said angioplasty syringe.

40. A system for electrically interconnecting the output signal from a pressure sensing transducer in fluid communication with the balloon-inflating chamber of an angioplasty syringe to a monitor of the pressure in the syringe, the system comprising:
a. a first length of cord having first and second free ends and being electrically interconnected at a first end thereof to the pressure sensing transducer;
b. a second length of cord distinct from said first length thereof and having first and second free ends;
c. first interconnection means on said first end of said second length of cord for electrically interconnecting said second length of cord to the monitor by urging said first interconnection means into engagement with a cooperating fitting on said monitor using a force applied to said first interconnection means in longitudinal alignment with said first end of said second length of cord;
d. cord connection means for releasably electrically coupling said second free ends of said first and second lengths of cord; and
e. means for stiffening said second length of cord adjacent to said first interconnection means to permit the electrical interconnection of said first coupling means to said cooperating fitting and to avoid other contact with said monitor.

41. A system as recited in claim 40, further comprising a first cord dispenser disposed in the course of said first length of the cord, said first cord dispenser comprising:
a. a portion of said first length of said cord wound into a tubular coil;
b. a tubular casing having first and second exit openings at opposite ends thereof, said first casing comprising a sleeve of heat-shrinkable material coaxially encircling said coil with the inner surface of said casing being in gripping engagement with the outer surface of said coil, one end of said first length of the cord extending from a radially innermost layer of the windings of said coil longitudinally through the center of said coil to said first exit opening, and the other end of said first length of the cord extending through said second exit opening, said coil being restrained from motion through said first and second exit openings, thereby enabling the unwinding of said first length of the cord from said coil by withdrawing said one end of said first length of the cord through said first exit opening.

42. A system as recited in claim 41, wherein said one end of said first length of the cord corresponds to said first free end thereof.

43. A system as recited in claim 41, wherein said one end of said first length of the cord corresponds to said second free end thereof.

44. A system as recited in claim 40, further comprising a second cord dispenser disposed in the course of said second length of the cord, said second cord dispenser comprising:
a. a portion of said second length of the cord wound into a tubular coil;
b. a tubular casing having first and second exit openings at opposite ends thereof, said casing comprising a sleeve of heat-shrinkable material coaxially encircling said coil with the inner surface of said casing being in gripping engagement with the outer surface of said coil, one end of said second length of the cord extending from a radially innermost layer of the windings of said coil longitudinally through the center of said coil to said first exit opening, and the other end of said second length of the cord extending through said second exit opening, said coil being restrained from motion through said first and second exit openings, thereby enabling the unwinding of said second length of the cord from said coil by withdrawing said one end of said second length of the cord through said first exit opening.

45. A system as recited in claim 44, wherein said one end of said second length of the cord corresponds to said first free end thereof.

46. A system as recited in claim 44, wherein said one end of said second length of the cord corresponds to said second free end thereof.

47. A system as recited in claim 40, further comprising:
  a. a first cord dispenser disposed in the course of said first length of the cord, said first cord dispenser comprising:
    i. a portion of said first length of said cord wound into a tubular coil; and
    ii a first tubular casing having first and second exit openings at opposite ends thereof, said first casing comprising a sleeve of heat-shrinkable material coaxially encircling said coil with the inner surface of said casing being in gripping engagement with the outer surface of said coil, one end of said first length of the cord extending from a radially innermost layer of the windings of said coil longitudinally through the center of said coil to said first exit opening, and the other end of said first length of the cord extending through said second exit opening, said coil being restrained from motion through said first and second exit openings, thereby enabling the unwinding of said first length of the cord from said coil by withdrawing said one end of said first length of the cord through said first exit opening; and
  b. a second cord dispenser disposed in the course of said second length of the cord, said second cord dispenser comprising:
    i. a portion of said second length of the cord wound into a tubular coil; and
    ii. a second tubular casing having first and second exit openings at opposite ends thereof, said casing comprising a sleeve of heat-shrinkable material coaxially encircling said coil with the inner surface of said second casing being in gripping engagement with the outer surface of said coil, one end of said second length of the cord extending from a radially innermost layer of the windings of said coil longitudinally through the center of said coil to said first exit opening, and the other end of said second length of the cord extending through said second exit opening, said coil being restrained from motion through said first and second exit openings, thereby enabling the unwinding of said second length of the cord from said coil by withdrawing said one end of said second length of the cord through said first exit opening.

48. A system as recited in claim 40, wherein said means for stiffening comprises a sleeve in tight encirclement about a portion of said second length of cord adjacent to said first interconnection means.

49. A system as recited in claim 48, wherein the course of said second length of cord within said sleeve comprises a double switch-back, thereby to retain in said sleeve at least three parallel serially interconnected lengths of said second length of cord.

50. A system as recited in claim 48, wherein said sleeve is comprised of a heat-shrinkable material contracted into engagement with said second length of cord.

51. A system as recited in claim 40, wherein said first end of said first length of cord is permanently electrically interconnected to said pressure sensing transducer.

52. A system for operably interconnecting a first medical device with a second medical device using a flexible, elongated member, said system comprising:
  a. a length of the elongated member having first and second free ends and being wound into a tubular coil;
  b. first interconnection means on said first end of said length of the elongated member for operably interconnecting said elongated member to said first medical device by urging said first interconnection means into engagement with a cooperating fitting on said first medical device using a force applied to said first interconnecting means in longitudinal alignment with said first end of said elongated member;
  c. a sleeve of heat-shrinkable material contracted into engagement with said elongated member adjacent to said first interconnection means for stiffening said elongated member adjacent to said first interconnection means to permit engagement thereof with said cooperating fitting and avoid other contact with said first medical device;
  d. second interconnection means on said second end of said length of the elongated member for operably interconnecting the elongated member to said second medical device;
  e. a tubular casing having a body portion and first and second exit openings at opposite ends thereof, said body portion coaxially encircling said coil with said first and second free ends of said elongated member extending from said casing through said first and second exit openings, respectively; and
  f. means for restraining motion of said coil through said first and second exit openings, thereby to enable unwinding of said elongated member from the radial center of said coil by withdrawing said first end of said elongated member through said first exit opening.

53. A system for operably interconnecting a first medical device with a second medical device using a flexible, elongated ember, said system comprising:
  a. a length of the elongated member having first and second free ends and being wound into a tubular coil;
  b. first interconnection means on said first end of said length of the elongated member for operably interconnecting said elongated member to said first medical device by urging said first interconnection means into engagement with a cooperating fitting on said first medical device using a force applied to said first interconnection means in longitudinal alignment with said first end of said elongate member;
  c. a sleeve in tight encirclement about said elongated member adjacent to said first coupling means, wherein the course of said elongated member within said sleeve comprises a double switch-back, thereby to retain in said sleeve at least three parallel, serially interconnected lengths of said elongated member;
  d. second interconnection means on said second end of said length of the elongated member for operably interconnecting the elongated member to said second medical device;

e. a tubular casing having a body portion and first and second exit openings at opposite ends thereof, said body portion coaxially encircling said coil with said first and second free ends of said elongated member extending from said casing through said first and second exit openings, respectively; and f. means for restraining motion of said coil through said first and second exit openings, thereby to enable unwinding of said elongated member from the radial center of said coil by withdrawing said first end of said elongated member through said first exit opening.

54. A system for electrically interconnecting the output signal from a pressure sensing transducer in fluid communication with the balloon-inflating chamber of an angioplasty syringe to a monitor of the pressure in the syringe, the system comprising:

a. a first length of cord having first and second free ends and being electrically interconnected at a first end thereof to the pressure sensing transducer;

b. a first cord dispenser disposed in the course of said first length of cord, said first cord dispenser comprising:

i. a portion of said first length of said cord wound into a tubular coil; and ii. a first tubular casing having first and second exit openings at opposite ends thereof, said first casing comprising a sleeve of heat-shrinkable material coaxially encircling said coil with the inner surface of said first casing being in gripping engagement with the outer surface of said coil, one end of said first length of the cord extending from a radially innermost layer of the windings of said coil longitudinally through the center of said coil to said first exit opening, and the other end of said first length of the cord extending between said coil and said inner surface of said first casing and through said second exit opening, said coil being restrained from motion through said first and second exit openings, and thereby enabling the unwinding of said first length of the cord from said coil by withdrawing said one end of said first length of the cord through said first exit opening;

c. a second length of cord distinct from said first length thereof and having first and second free ends; and d. a second cord dispenser disposed in the course of said second length of cord, said second cord dispenser comprising:

i. a portion of said second length of the cord wound into a tubular coil; and ii. a second tubular casing having first and second exit openings at opposite ends thereof, said casing comprising a sleeve of heat-shrinkable material coaxially encircling said coil with the inner surface of said second casing being in gripping engagement with the outer surface of said coil, one end of said second length of the cord extending from a radially innermost layer of the windings of said coil longitudinally through the center of said coil to said first exit opening, and the other end of said second length of the cord extending between said coil and said inner surface of said casing and through said second exit opening, said coil being restrained from lateral motion through said first and second exit openings, and thereby enabling the unwinding of said second length of the cord from said coil by withdrawing said one end of said second length of the cord through said first exit opening;

e. first interconnection means on said first end of said second length of cord for electrically interconnecting said second length of cord to the monitor by urging said first interconnection means into engagement with a cooperating fitting on said monitor using a force applied to said first interconnection means in longitudinal alignment with said first end of said second length of cord;

f. cord connection means for selectively and releasably and electrically coupling said second free ends of said first and second lengths of cord; and g. means for stiffening said second length of cord adjacent to said first interconnection means to electrically interconnect said first coupling means to said cooperating fitting and avoid all other contact with said monitor.

* * * * *

UNITED STATES PATENT AND TRADEMARK OFFICE
CERTIFICATE OF CORRECTION

PATENT NO. : 5,118,907

DATED : June 2, 1992

INVENTOR(S) : THOMAS D. STOUT et al.

It is certified that error appears in the above-identified patent and that said Letters Patent is hereby corrected as shown below:

Column 1, line 55, "ferror magnetic" should be --ferromagnetic--
Column 1, lines 66-67, "wire, cord, or cord" should be --wire, tube or cord--
Column 4, line 7, "angioplastic procedures" should be --angioplasty procedures--
Column 4, line 16, delete "therefor"
Column 5, line 27, delete "is"
Column 7, line 56, "therefore" should be --therefor--
Column 8, line 29, "angioplastic procedure" should be --angioplasty
Column 9, line 12, "and interconnection" should be --an interconnection--
Column 9, line 51, "are lose" should be --are loose--
Column 9, line 51, "weight" should be --weigh--
Column 10, line 35, "in" should be --is--
Column 11, line 22, "coil 5." should be --coil 54.--
Column 11, line 68, after "casing 66" insert --is by--
Column 13, line 53, "layer," should be --layer;--
Column 14, line 63, "$" should be deleted
Column 16, line 22, "do position" should be --to position--

UNITED STATES PATENT AND TRADEMARK OFFICE
CERTIFICATE OF CORRECTION

PATENT NO. : 5,118,907

DATED : June 2, 1992

INVENTOR(S) : THOMAS D. STOUT et al.

It is certified that error appears in the above-identified patent and that said Letters Patent is hereby corrected as shown below:

```
Column 17, line 9, after "and" insert --to--
Column 17, line 26, after "each" insert --of--
Column 18, line 11, after "and" insert --to--
Column 18, line 60, "ember" should be --member--
Column 19, line 14, after "and" insert --to--
Column 25, line 3, "sad" should be --said--
Column 26, line 42, after "and" insert --to--
```

Signed and Sealed this

Thirty-first Day of August, 1993

Attest:

*Attesting Officer*

BRUCE LEHMAN

*Commissioner of Patents and Trademarks*